UNITED STATES PATENT OFFICE.

PAUL HENRY SCHMID, OF NEW YORK, N. Y.

IMPROVEMENT IN MEDICAL COMPOUNDS FOR PURIFYING THE BLOOD.

Specification forming part of Letters Patent No. 120,333, dated October 24, 1871.

*To all whom it may concern:*

Be it known that I, PAUL HENRY SCHMID, of the city, county, and State of New York, have invented a new and Improved Medical Compound; and I do hereby declare the following to be a full, clear, and exact description thereof, which will enable those skilled in the art to make and use the same.

This invention relates to a compound intended particularly to cleanse the blood and keep the bowels open, thus forming a preventive against many and a good remedy for manifold other diseases.

My compound is made of the following ingredents: Prp. herb. absinth., herb. cardui benedict, herb. cent. minor, herb. trifol. fibrin, each two ounces; herb. millifol, one ounce; herb. boris mar., four drams; herb. salvia, one dram; flor millefol, one ounce; agaric alb., aloes, each six drams; myrrh, two drams; cort. chin. reg., two ounces; cort. cinnam., four drams; cort. aurant, two ounces; cort. cascarill., four drams; rad. gentian, rad. galangee, rad. rhei, each one ounce; rad. zedoar, half ounce; rad. calami, two drams; rad. zingib., six drams; sem. cardamom, four drams; poma. aurant. immat., one ounce; caryophyll, three drams; confect. opii, two and a half drams. Conc. et mix.

From these ingredients I prepare an extract by subjecting them to heat in forty quarts of water. After six days the mass is passed through a filter, and then the liquid extract is reduced to the consistency of sirup by evaporation. This sirup is thinned with ten quarts of brandy; then it is allowed to settle, and finally I add to each quart of liquid one-eighth ounce of acetic ether diluted in alcohol, (spir. acetico æthereus,) and bottle it in vials of the desired capacity.

This compound proves to be an excellent remedy in all diseases or sicknesses of the stomach and of the bowels, diarrhœas, female diseases, asthma, colds in the head, boils, most all kinds of fevers, cholera, sea-sickness. It must not be used in inflammatory diseases, measles, small-pox, &c.

What I claim as new, and desire to secure by Letters Patent, is—

The within-described compound, made substantially as set forth.

This specification signed by me this 28th day of September, 1871.

P. H. SCHMID.

Witnesses:
W. HAUFF,
E. F. KASTENHUBER. (98)